United States Patent

Kah, Jr.

[15] 3,635,237
[45] Jan. 18, 1972

[54] METHOD AND APPARATUS FOR FULL SHUTOFF SEQUENCING VALVE

[72] Inventor: Carl L. C. Kah, Jr., 778 LaKeside Drive, North Palm Beach, Fla. 33403

[22] Filed: Apr. 17, 1970
[21] Appl. No.: 29,513

[52] U.S. Cl..........................137/119, 137/624.18, 137/627, 239/66, 239/67
[51] Int. Cl..................F16k 21/00, F16k 21/60, B05b 9/00
[58] Field of Search..............................239/66, 97; 137/119

[56] References Cited

UNITED STATES PATENTS

| | | | |
|---|---|---|---|
| 3,533,432 | 10/1970 | Kirby | 137/119 |
| 3,369,565 | 2/1968 | Haggard | 137/624.18 X |
| 3,147,770 | 9/1964 | Perlis | 251/77 X |
| 1,326,046 | 12/1919 | Goodhue | 137/119 |
| 1,753,240 | 4/1930 | Howell et al. | 137/119 |
| 2,619,105 | 11/1952 | Hauser | 137/119 |
| 2,880,757 | 4/1959 | Campbell | 239/66 X |
| 2,968,311 | 1/1961 | Whitlock | 137/119 |
| 3,459,208 | 8/1969 | Clyde | 137/119 |
| 3,460,560 | 8/1969 | Kah et al. | 137/119 |
| 3,524,470 | 8/1970 | Kah et al. | 137/119 X |

Primary Examiner—Herbert F. Ross
Assistant Examiner—David J. Zobkiw
Attorney—Colton & Stone

[57] ABSTRACT

A sequencing valve which distributes line pressure from a single-inlet flow line, sequentially, through a plurality of outlet flow lines as a selective function of pulsating line pressure or an independently operated pilot valve. The sequencing valve includes a housing having a valving member positioned between the inlet line and the outlet lines. The valving member consists of a number of pie-shaped hinged flaps or valve elements corresponding to the number of outlet lines. Each flap is sequentially raised by a lifting foot which undergoes reciprocable and step-by-step rotatable movement in response to changes in inlet line pressure or pilot valve operation.

8 Claims, 7 Drawing Figures

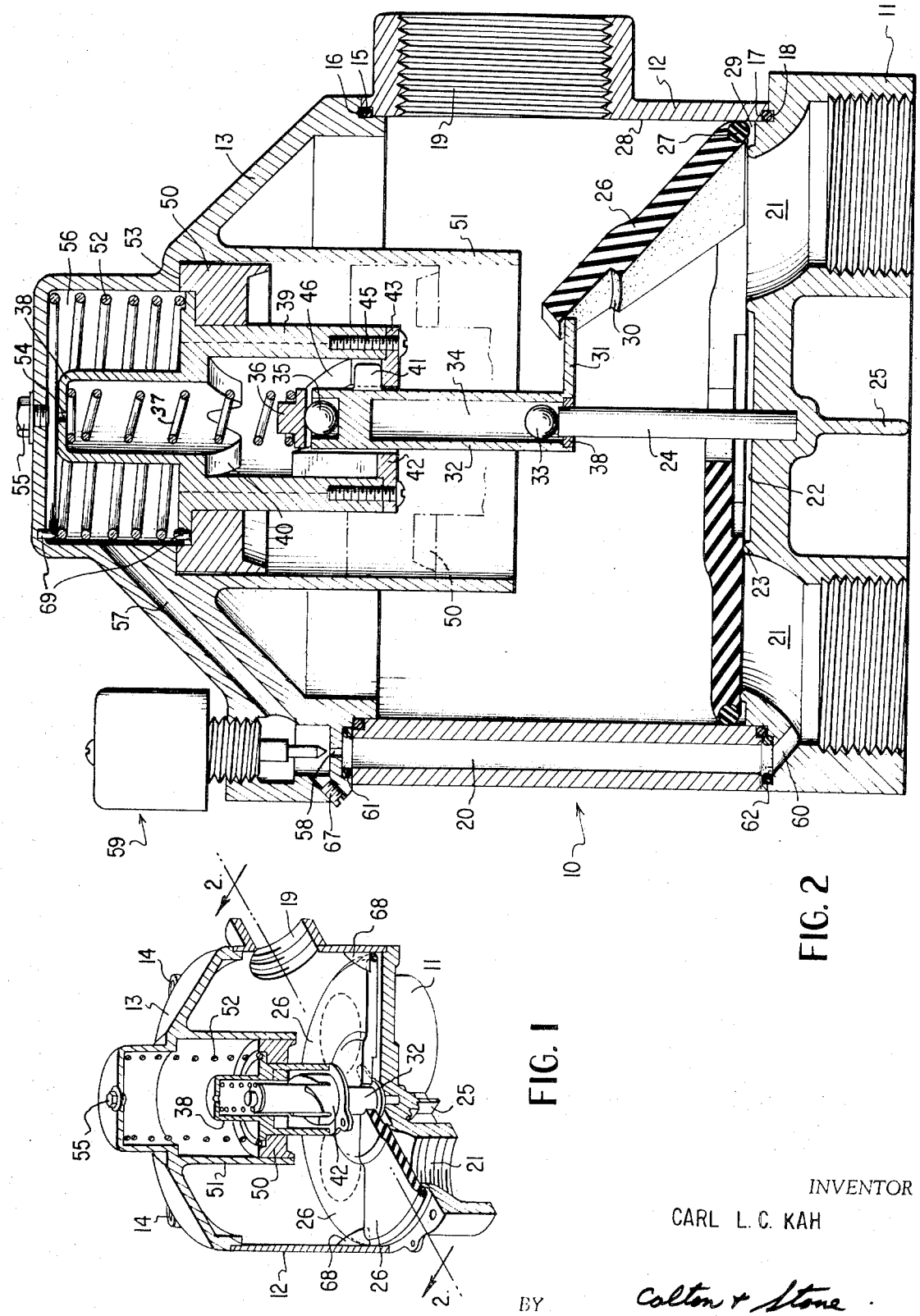

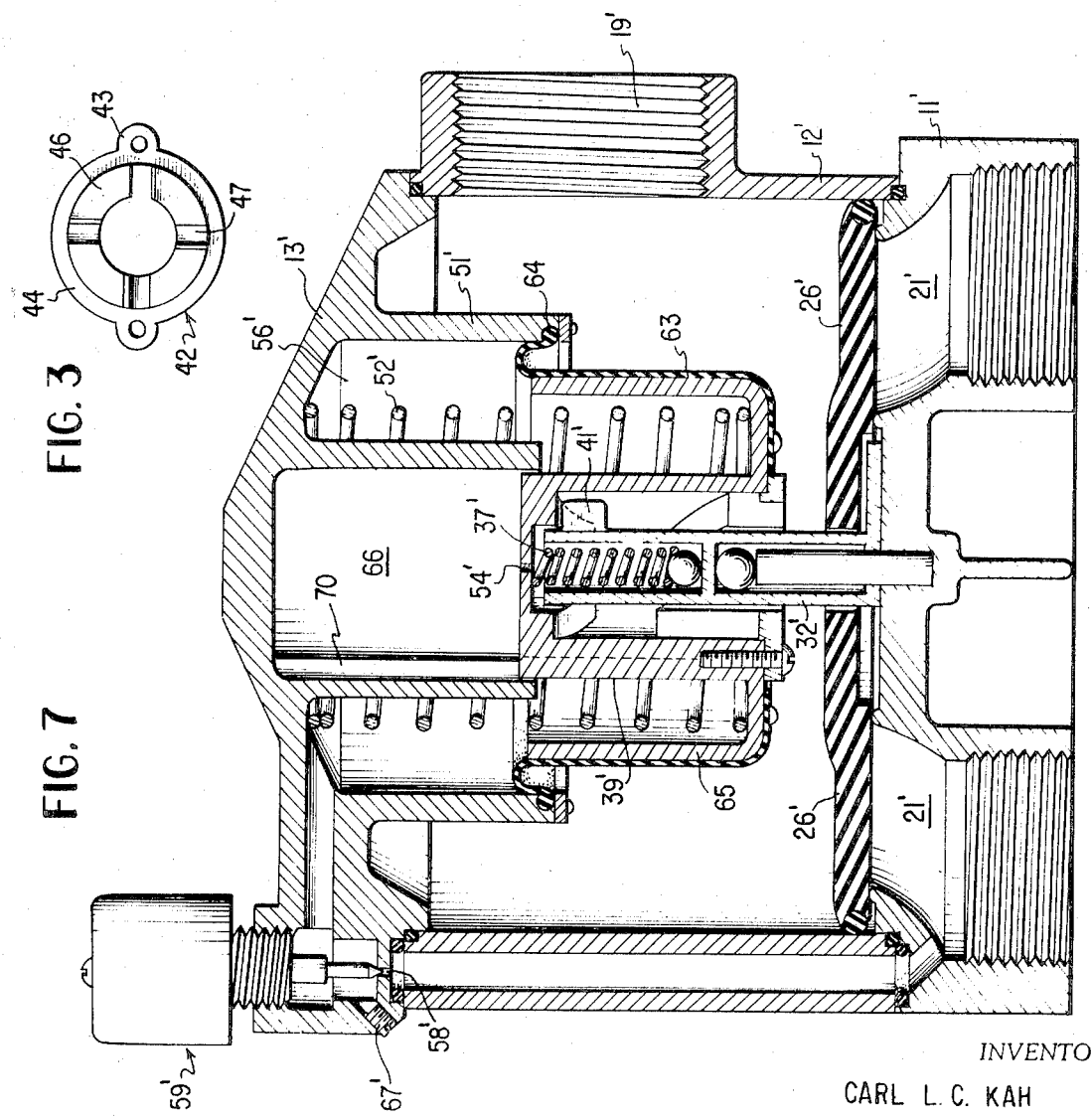

METHOD AND APPARATUS FOR FULL SHUTOFF SEQUENCING VALVE

BACKGROUND OF THE INVENTION

The invention relates generally to valves of the type disclosed in U.S. Pat. Nos. 2,666,450 and 3,369,565 and, more particularly, to that disclosed in U.S. Pat. Nos. 3,460,560.

Sequencing valves of the type previously known have not been adapted to completely shut off flow to all outlet line systems, necessitating a separate shutoff valve for an irrigation or sprinkler system. Additionally, pressure-operated valves of the type previously known have required a certain minimum flow to operate effectively. Also, known valves which start a sequencing cycle with all outlets open and then close all but the selected outlet are subject to undesirable water hammering.

SUMMARY OF THE INVENTION

It is a primary object of the invention to provide a sequencing valve which starts each sequencing cycle with all outlets closed and sequentially opens selected outlets. Such construction permits the same to perform the additional function of a shutoff valve and substantially eliminates water hammer.

It is among the further objects of the invention to provide a sequencing valve which is insensitive not only to elevational differences in terrain among the various outlet lines but also to dirt or other fluid-entrained contamination and for which there is virtually no minimum flow requirement.

The foregoing objects are achieved by forming the valving member of a plurality of outlet closure valves or flaps, each of which may be individually pivoted from the closed to the open position by the action of a lifting foot which reciprocates and undergoes step-by-step rotation in response to inlet line pressure or an independently controlled pilot valve. Since all outlet flaps may be closed simultaneously, the valve of the present invention can function as a shutoff valve for a sprinkler system as well as fulfilling the normal function of a sequencing valve. The positive actuation of the lifting foot in opening the valve flaps against inlet pressure eliminates the water hammer associated with valve that start a sequencing cycle with outlets open. The positive actuation of the valve element also renders the valve insensitive to residual system differential pressures which result from differences in elevation of the outlet lines.

DESCRIPTION OF THE DRAWINGS

A more complete understanding of the invention will follow from a description of the accompanying drawings wherein:

FIG. 1 is a perspective view, partially in section, depicting one embodiment of the present invention with all valving elements in the closed position;

FIG. 2 is a sectional elevation taken along line 2—2 of FIG. 1 but in which the actuator piston is in the upper position and one outlet is open;

FIG. 3 is a tip plan view of a lower cam member carried by the actuator piston of FIGS. 1 and 2;

FIG. 4 is an elevation of the cam member of FIG. 3;

FIG. 5 is a schematic development of the cam surfaces of the upper and lower cam members carried by the actuator piston and the cam follower carried by the indexing stem;

FIG. 6 is an alternative arrangement of the upper and lower cam members of FIG. 5; and FIG. 7 is an alternative embodiment of the invention having a diaphragm in place of the actuator piston of FIGS. 1 and 2.

DESCRIPTION OF THE PREFERRED EMBODIMENTS

The housing 10, depicted in FIGS. 1 and 2 is composed of a lower section 11, an intermediate section 12 and an upper section 13. The three sections are assembled by means of bolts 14 and maintained in sealed relationship by means of an O-ring 15 received in annular groove 16 formed in the upper section 13 and an O-ring 17 received in an annular groove 18 formed in the lower section 11.

The intermediate section 12 of the housing contains an internally threaded inlet port 19 and a passage 20 intercommunicating a portion of upper housing 13 with an outlet port formed in the lower housing section 11 for a purpose that will subsequently become apparent.

Lower housing section 11 contains a desired number of internally threaded outlet ports 21, four of which have been depicted for the purposes of example in the accompanying drawings. The upper surface 22 of lower section 11 is formed with raised integral metal rings 23 surrounded the upstream end of each outlet port and projecting above the surface 22 for sealing engagement with a multipart valving member. Guide rod 24 is staked or otherwise secured to lower housing section 11 and extends upwardly from surface 22. The outer wall of lower section 11, centrally of the outlet ports, may be provided with suitable reinforcing webs 25.

The multipart valving member is defined by a plurality of valving elements or flaps 26, each of which flaps overlies an individual outlet port. The valving flaps are preferably molded from rubber though it will be apparent that plastic, metal or other materials may be used. In the preferred embodiment, each valve element 26 is pie shaped although it is obvious that other shapes in the nature of spheres or the like could be used. In the configuration shown, an "O"-ring 27 is bonded into a groove formed on the outer circumference of the multiport valving member. Thus the valving flaps are interconnected by the "O"-ring which also serves as a hinge for each valve flap, with the space 29 accommodating the relative hinging movement of the "O"-ring as indicated in FIG. 2. Sealing of each outlet is accomplished by the resilient pie-shaped flap valves being pressed downwardly onto the raised lips 23. The proper positioning of flap valves 26 relative to their respective outlet ports is maintained by tabs 68 extending outwardly from the inner surface 28 of the intermediate housing and between one or more adjacent flap valve pairs. In FIG. 2, is illustrated a single one of the flap valves in the open position while the remainder of the valves are shown in position to block flow through their respective ports. The inner ends of each valving member are recessed, as at 30, to provide a central, annular cavity in the valving member within which an indexing foot 31 may rotate.

The foot 31 is carried on the lower end of tubular shaft 32 which is provided with an opening 34 to receive guide rod 24 and a staked insert collar to prevent pivot ball 33 from dropping out during disassembly. Hollow portion 34 of shaft 32 is provided with the ball 33 to facilitate rotation of the shaft when the shaft is in its lower position and a second ball 35 is positioned on an abutment adjacent the upper end of shaft 32, also to facilitate rotation. A follower 36 is biased against ball 35 by a coil spring 37 reacting between the follower and an upward extension 38 of tubular sleeve 39, whereby shaft 32 is biased by the action of spring 37 into the lower position relative to sleeve 39 as shown in FIG. 2. Shaft 32 is slidably and rotatably received in sleeve 39 which may be secured to piston 50. An upper cam member 40 is formed integral with the sleeve for cooperation with a follower 41 carried by shaft 32. A lower cam member 42 is removably received within the lower open end of tubular sleeve 39 and by means of lobes 43 formed on the peripheral flange 44 of the lower cam member, screws 45, extending through openings in the lobes, secures the lower cam member to the tubular sleeve 39, so that this cam member also cooperates with the follower 41 carried by tubular shaft 32. Lower cam member 42 may be split into two halves so that it can be assembled around stem 32 prior to installing the lower cam into sleeve 39.

As shown in FIGS. 3 and 4, the lower cam member 42 carries four cam surfaces 46, spaced by slots 47, since there are four outlet ports 21. It will be understood that any desired number of outlet ports can be provided, and accommodated by selecting cams having a corresponding number of cam surfaces. Additionally, the lower cam member could be provided with a lesser number of cam surfaces. An example of a lower cam member 42' exhibiting this arrangement is shown diagrammatically in FIG. 6, in which there are three cam surfaces 46' separated by slots 47', the elongated cam surface 49 having lesser slope than the other cam surfaces 46'. Such a construction would permit one to convert from a four-outlet to a three-outlet sequencing valve merely by substituting a different lower cam member to cooperate with the same follower and upper cam.

Piston 50 is freely reciprocable within a cylindrical extension 51, depending from the upper housing section 13, in response to pressure differentials across the face of the piston. The piston is prevented from rotating by reference tangs 69 on the ends of the bias spring which fit into reference holes in the top 13 and the top of piston 50. When the piston 50 is in the raised position, abutment 53 formed in upper housing section 13 is in sealing engagement with the upper surface of the piston. A bleed aperture 54 formed in extension 38 of tubular sleeve 39 provides communication between the interior of sleeve 39 and a chamber 56 defined by the upper surface of piston 50 and upper housing section 13, whereby fluid pressures across the face of the piston may be equalized. Plug 55 in upper housing section 13 may be removed to provide access to bleed 54 for cleaning or inspection. A passage 57 provides communication between chamber 56 and port 58 which is controlled by a solenoid-operated pilot valve 59. Port 58 opens into passage 20 formed in the intermediate section 12 of the housing which in turn communicates with an outlet 21 by way of passage 60 in the lower housing section 11. O-rings 61 and 62 seal the connections between the respective housing sections.

The sequencing cycle of the valve begins with the pilot valve 59 in a closed position blocking port 58. With the pilot valve closed and pressure exerted at inlet port 19 fluid pressure is communicated via the relatively loose fittings between shaft 32 and the center hole in lower cam 42 to equalize across piston 50 through bleed 54 and piston will be in the lower position as shown in FIG. 1 due to the bias of spring 52. In this position spring 37 is compressed, shaft 32 and foot 31 are in the lower position and all valving elements 26 are closed. When pilot valve 58 is opened the fluid above the piston 50 is vented to a low-pressure area such as an outlet 21, or it may be vented overboard. The outflow passages from chamber 56 are so sized to insure that the outflow is greater than fluid inflow through bleed 54. This creates a sufficient pressure differential across piston 50 to overcome the downward bias of spring 52 and move upwardly to the position of FIG. 2. However, shaft 32 remains in the lower position under the bias of spring 37 as piston 50 begins to rise. Lower cam member 42 rises with piston 50, and cam surface 46 is thereby brought into engagement with cam follower 41 carried by shaft 32. Shaft 32, still in the lower position, is rotated by the upward movement of lower cam member 42 until cam follower 41 enters slot 47. Thus when piston 50 reaches the dotted-line position shown in FIG. 2, spring 37 has been fully extended, shaft 32 has been rotated so that foot 31 in position to lift a valving member 26, and no further rotation of shaft 32 is possible since cam follower 41 is retained in slot 47. As the piston 50 continues its upward travel, shaft 32 is raised and one of the valve members 26 is lifted by foot 31 as shown in FIG. 2.

With the valve elements in the position shown in FIG. 2, closing the pilot port 58 will cause piston 50 to move downwardly as the pressure again equalizes across the same via bleed 54. It should be noted that spring 37 will prevent the cam follower 41 from moving relative to sleeve 39 and the upper and lower cam surfaces during the initial downward movement of piston 50 until the same is in the intermediate dotted-line position shown in FIG. 2 and the shaft 32 is in the fully lowered position. Further downward movement of the piston 50 compresses spring 37 and brings cam follower 41 into engagement with a cam surface of upper cam 40, whereby shaft 32 rotates and lifting foot 31 is partially indexed by the downstroke of the piston 50. Two distinct indexing movements, i.e., that imparted on successive downward and upward movements of the piston must be applied to shaft 32 to rotate the same from a position underlying one valve element to a position underlying the immediately adjacent valve element.

The interaction between the upper and lower cam surfaces, 40 and 42 respectively, and the cam follower 41 can be more clearly understood by reference to the somewhat diagrammatic developments depicted in FIGS. 5 and 6. It should be noted that the arrows shown in FIGS. 5 and 6 are representative only of the relative motion between the cam elements and the cam follower since it is apparent from the preceding discussion that the vertical component of the relative motion is provided by the up-and-down movement of the cam elements 40 and 42 while the rotational movement is imparted by the cam follower 41. Thus, with reference to FIG. 5, cam follower 41 is shown as it moves upwardly relative to the upper cam. Further upward movement from the FIG. 5 position results in cam follower movement along surface 48 and rotation of the follower through approximately half the angle necessary for the positioning of foot 31 in underlying relationship to the next valve element. The subsequent relative downward movement of the follower (upward movement of the lower cam) then coacts with lower cam surface 46 to complete the rotation into underlying relation to the next valve element. At this point, follower 41 is engaged with slot 47 and the final upward movement of piston 50, past the dotted-line position of FIG. 2, results in raising one flap 26. Repeated opening and closing of port 58 by the pilot valve will then continue the sequencing operation just described to, sequentially, open each outlet port, individually, as a function of pilot valve operation.

In the alternative embodiment of the invention depicted in FIG. 7 wherein parts corresponding to those described in connection with FIGS. 1 and 2 are indicated by prime reference characters; a diaphragm 63 is secured at its peripheral edge 64 to the lower end of cylindrical sleeve 51' depending from upper housing section 13'. The central portion of the diaphragm 63 is secured to the tubular sleeve 39' at its lower extremity. Sleeve 39' may include an integral cup-shaped member 65 to position diaphragm 63. Tubular sleeve 39' is loosely reciprocable within chamber 66. Since spring 37' is confined to the interior of sleeve 39', the upper end of tubular shaft 32' is utilized to house spring 37'. The operation of this embodiment of the invention is essentially the same as that previously described as will be apparent to those skilled in the art.

When it is desired to utilize pulsating line pressure to sequence either of the valves; port 58 or 58' is permanently closed as by blocking the same or using a normally closed pilot valve and disconnecting the same. Tapped bleed 54 or 54' is capped and the upper cavity iv vented to the out side by removal of the screw 67 or 67' blocking a vent port. Pulsating line pressure admitted at port 19 or 19' now results in the raising and lowering of the piston, or diaphragm, as a function of the cyclic pressure changes. In the latter embodiment the fluid actuator (piston or diaphragm) is, of course, sized to have a pressure surface area sufficiently in excess of that represented by each individual valve flap to overcome the pressure force applied thereto as well as the spring bias. When using the piston configuration of FIG. 2 as a line pressure sequenced valve, piston leakage into cavity 56 and then overboard via passage 57 and the vent port is shut off when the piston 50 reaches the top of the stroke and seats on abutment 53 on top 13.

The pulsating inlet line pressure may be effected in any desired conventional manner such as starting and stopping a pump or by the positioning of a timer-actuated shutoff located in the inlet line.

The improvement valve configurations have proven insensitivity to dirt in the fluid if working part fits are kept loose (i.e., 1/32 on diameter between pin 24 and hole 38 in shaft), Although the inlet 19 can be located at any desired location in the intermediate housing, the tangential arrangement shown gives smoother fluid flow through the valve, less pressure drop and also any dirt or sand in the fluid tends to be thrown to the outside for cleaner sequencing-cam operation.

I claim:

1. Sequencing valve means, comprising; a housing having an inlet port in open fluid communication with the upstream side of each of a plurality of valve elements pivotally mounted adjacent one peripheral edge thereof for individual opening movement in an upstream direction and closing movement in a downstream direction relative to a like plurality of outlet ports in said housing, actuator means including a pressure-responsive actuator and valve lifter means engageable with an opposite peripheral edge of each said valve element for sequentially opening and closing individual ones of said valve elements in response to pressure differentials across said actuator.

2. The sequencing valve means of claim 1 including port means and an independently operated pilot valve for sequentially affording and blocking fluid communication between one side of said pressure-responsive actuator and a region of lower pressure.

3. The sequencing valve means of claim 2 including bleed means intercommunicating opposite sides of said pressure-responsive actuator, and said bleed means providing a more restricted flow passage than said port means.

4. The sequencing valve means of claim 1 wherein said valve means includes a lifting foot positioned for individual engagement with the downstream side of selected ones of said valve elements for lifting the same in the upstream direction; and cam means intermediate said pressure-responsive actuator and lifting foot for selecting said individual engagement.

5. The sequencing valve means of claim 4 including a lost motion connection between said pressure-responsive actuator and lifting foot.

6. The sequencing valve means of claim 1 including means for reducing the pressure on one side of said pressure-responsive actuator for producing said pressure differentials.

7. The sequencing valve means of claim 1 including means for increasing the pressure on one side of said pressure-responsive actuator for producing said pressure differentials 8. A sequencing valve, comprising: a housing having an inlet port and a plurality of outlet ports, a valve element pivotally mounted adjacent one side of each of said outlet ports for individual opening movement in an upstream direction and closing movement in a downstream direction, a pressure-responsive actuator, valve lifter means mounted in said housing on a side of said outlet ports remote from said one side for selectively engaging individual ones of said valve elements at a location thereon remote from the pivotal mounting thereof for opening the same, and means including said pressure-responsive actuator for actuating said filter means for sequentially opening and closing individual ones of said valve elements in response to pressure differentials across said actuator.

* * * * *

UNITED STATES PATENT OFFICE
CERTIFICATE OF CORRECTION

Patent No. 3,635,237　　　　　　　　Dated January 18, 1972

Inventor(s) Carl L. C. Kah, Jr.

It is certified that error appears in the above-identified patent and that said Letters Patent are hereby corrected as shown below:

| | | |
|---|---|---|
| Column 1 | Line 42 | "valve" should be "valves" |
| Column 1 | Line 56 | "tip" should be "top" |
| Column 2 | Line 10 | "surrounded" should be "surrounding" |
| Column 3 | Line 3 | insert "a" after having |
| Column 3 | Line 36 | insert "the" before piston |
| Column 4 | Line 18 | "positioning" should be "positionment" |
| Column 4 | Line 50 | "iv" should be "is" |
| Column 4 | Line 66 | "positioning" should be "positionment" |
| Column 4 | Line 68 | "improvement" should be "improved" |
| Column 4 | Line 70 | after "shaft)" change (,) to (.) |
| Claim 4 | Line 24 | insert "lifter" before "means" |
| Claim 8 | Line 23 | "filter" should be "lifter" |

Signed and sealed this 11th day of July 1972.

(SEAL)
Attest:

EDWARD M. FLETCHER, JR.　　　　　　ROBERT GOTTSCHALK
Attesting Officer　　　　　　　　　Commissioner of Patents